United States Patent [19]
Boyer

[11] Patent Number: 6,099,657
[45] Date of Patent: Aug. 8, 2000

[54] METHOD FOR CLEANING A PIPE

[76] Inventor: Mark L. Boyer, 9310 Reid Lake, Houston, Tex. 77064

[21] Appl. No.: 09/351,063

[22] Filed: Jul. 9, 1999

Related U.S. Application Data

[62] Division of application No. 08/975,858, Nov. 21, 1997, Pat. No. 5,950,271.

[51] Int. Cl.[7] ........................................................ B08B 9/04
[52] U.S. Cl. ............................................. 134/8; 15/104.31
[58] Field of Search .............................. 134/8; 15/104.31, 15/104.05

[56] References Cited

U.S. PATENT DOCUMENTS

| | | |
|---|---|---|
| 1,117,192 | 11/1914 | Kelly . |
| 1,732,277 | 10/1929 | Owens . |
| 2,106,004 | 1/1938 | Inglee . |
| 2,755,810 | 7/1956 | Kurt . |
| 3,600,736 | 8/1971 | Smith . |
| 3,685,083 | 8/1972 | Jones . |
| 3,708,819 | 1/1973 | Breston . |
| 5,244,505 | 9/1993 | Allison et al. ........................ 134/22.11 |
| 5,444,887 | 8/1995 | Rufolo . |
| 5,580,393 | 12/1996 | Lawther . |

FOREIGN PATENT DOCUMENTS

| | | |
|---|---|---|
| 287469 | 11/1970 | U.S.S.R. . |

*Primary Examiner*—Zeinab El-Arini
*Attorney, Agent, or Firm*—Jenkens & Gilchrist, A Professional Corporation

[57] ABSTRACT

A method for cleaning a pipe using a swab that can be made of one or multiple tires connected to one or more cables and pulled through the host pipe during the cleaning process. The cables are attached to rigid plates mounted in the central opening of the tire. The method provides an effective and low cost method to remove debris and mud particularly from underground pipe.

4 Claims, 11 Drawing Sheets

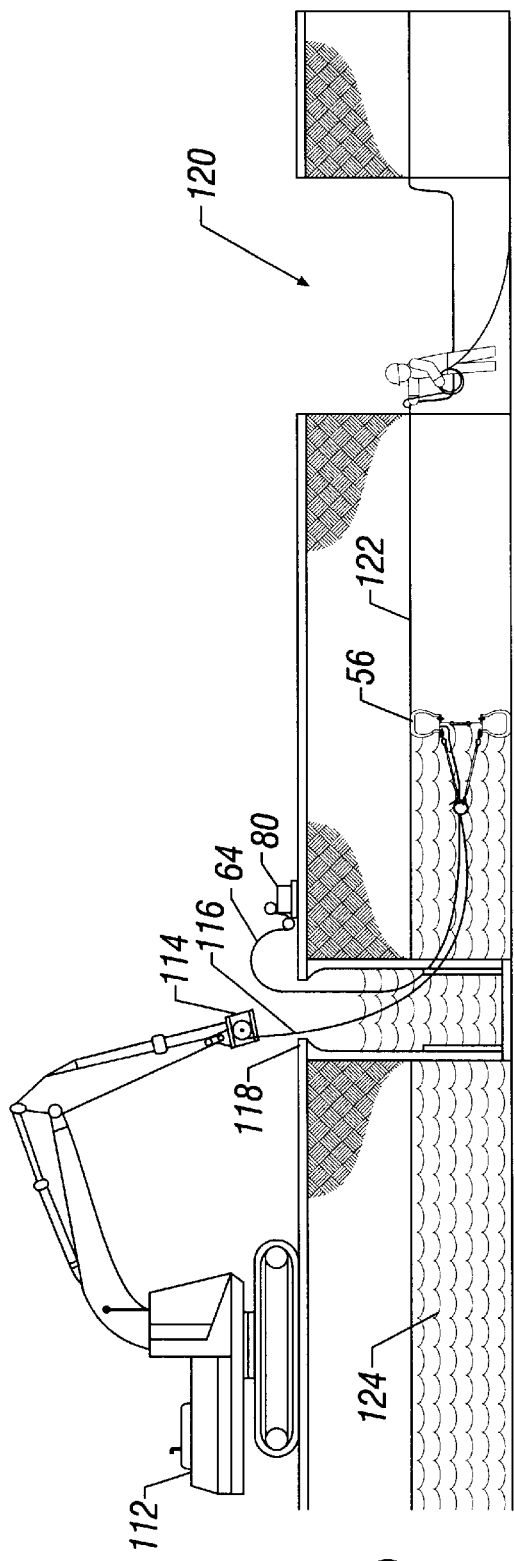
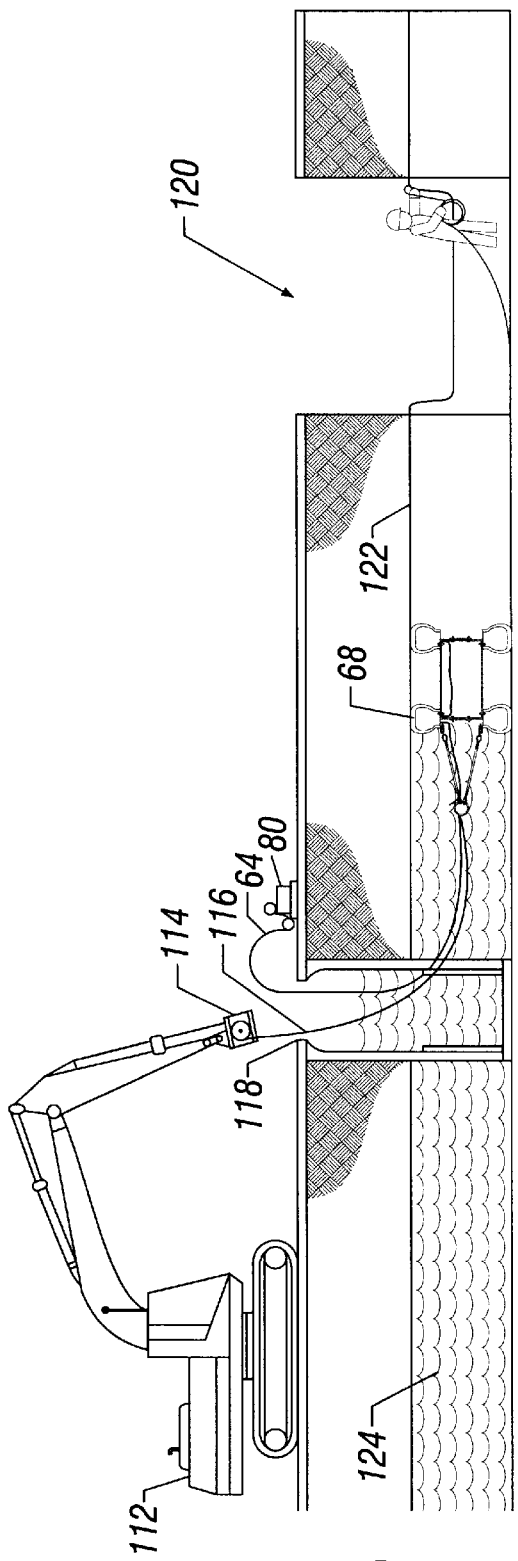

METHOD FOR CLEANING A PIPE

This application is a divisional of U.S. application Ser. No. 08/975,858 filed Nov. 21, 1997, now U.S. Pat. No. 5,950,271.

FIELD OF INVENTION

The invention relates to a swab that is used to clean and plug pipe lines.

BACKGROUND OF THE INVENTION

In the course of maintaining and rehabilitating utility lines including pipe lines, it is sometimes necessary to clean or swab these lines in order to ascertain their condition. Debris can build up and collect on the interior walls of an existing pipe. This debris must be cleaned before any repairs or rehabilitation can be made. Additionally, it is sometimes necessary to plug these lines in order to perform inspections or repairs. However, many of these lines cannot remain blocked or out of service for very long.

SUMMARY OF THE INVENTION

A swab has been developed for use in cleaning utility lines. The swab can be made of a flexible, circular member such as a tire having a front side with a front lateral sidewall, a rear side with a rear lateral sidewall, an exterior surface, an interior cavity and a central orifice. A steel plate is concentrically mounted against each lateral sidewall of the tire. The steel plates are attached to each other by four connecting rods which engage both plates by extending through both the tire and the plates. A yoke attachment point fixed to each end of connecting rods and a flexible yoke is attached to each point. Two cable attachment points connect all of the yokes on each side of the tire. In one embodiment, a flow pipe with a valve and valve actuator extends through the central orifice of the tire.

In alternative embodiments, the exterior surface of the tire could be smooth or a raised tread. Also, the interior cavity of the tire could be filled with a foam such as a low density foam. In another embodiment, three tires are aligned in a side by side arrangement to form a swab. Two steel plates are concentrically mounted against the front and rear sidewalls of the exterior tires in the arrangement.

A method is claimed for cleaning a host pipe with both a single tire swab and a multi-tire swab. The steps include positioning the swab in the host pipe, connecting each cable attachment point to a cable, and pulling the swab through the host pipe.

A pipe plug has been developed for use in plugging pipe lines. The pipe plug comprises a tire having a front side with a front lateral sidewall, a rear side with a rear lateral sidewall, an exterior surface, an interior cavity and a central orifice. A tire rim with an axle connector is mounted with the central orifice of the tire. A steel plate covers the axle connector. A valve stem extends from the tire through the tire rim. An air tube which provides air from a compressed air source is connected to the valve stem. Four connecting rods engage and extend through the tire rim. A yoke attachment point fixed to each end of connecting rods and a flexible yoke is attached to each point. Two cable attachment points connect all of the yokes on each side of the tire.

In an alternative embodiment, the exterior surface f the tire could be smooth. A further embodiment includes bladder disposed in the interior orifice of the tire to old the compressed air. In another embodiment, two tires are used to form a dual-tire plug. A pipe which extends through the tire rims connects the two tires. A transfer tube connects the interior cavities of each tire so that a single source of compressed air may be used to inflate the plug. A flow orifice is located inside the tire rim of each tire and a valve with a valve actuator is located in the pipe which connects the tires.

A method is claimed for using both the single tire plug and the multi-tire plug. The steps include positioning the plug within the host pipe, inflating the plug until the exterior surface of the plug contacts the host pipe, and deflating the plug when it is to be removed.

BRIEF DESCRIPTION OF THE DRAWING

FIG. 15 is a perspective view of an operation using a plug.

FIG. 16 is a perspective view of an operation using a multi-member plug.

DESCRIPTION OF THE PREFERRED EMBODIMENTS

The following is a description of the invention and figures. In different figures, the same elements are represented with the same numbers.

Figure 1:
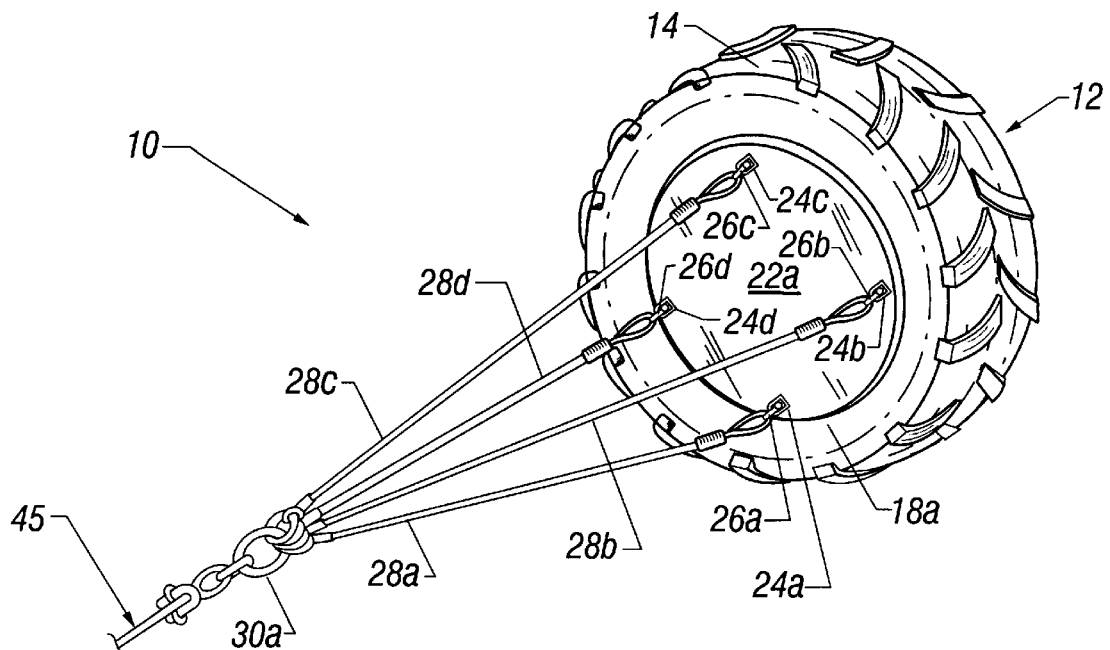
FIG. 1 is a perspective view of a swab.

FIG. 1 shows a detailed perspective view of a tire swab 10. The tire swab 10 includes a tire 12, a rigid plate 22a, four yoke attachment points 26a–d, four yokes 28a–d, and a cable attachment point 30a.

The tire itself can be a new or used tire. The use of old tires is a key benefit of the claimed invention. Old tires which are no longer usable on vehicles present a significant environmental disposal problem. The use of recycled tires can be a significant economic benefit in manufacturing. Tires that are damaged from use as a swab can be easily and quickly replaced at a low cost.

The tire 12 is selected for a size to fit within the diameter of the host pipe which will be cleaned. The tire 12 can compress when encountering an obstruction which would lodge a rigid swab. As shown, the exterior surface 14 of the tire 12 has a rough, raised tread. However, the exterior surface 14 may be smooth so that it contacts the wall of the host pipe more fully. The exterior surface 14 of the tire 12 may be made smooth and the outside diameter of the tire 12 can be augmented by any re-treading or re-capping process for used tires. In re-capping the tire, different types of materials may be used to produce a different type of texture on the exterior surface 14 of the tire 12.

While embodiments which use tires are shown in the drawings, any suitable alternative could be used. Such an embodiment would have a circular shaped member to contact the walls of the host pipe to be cleaned. Furthermore, this member would also have the necessary flexibility to compress or deflect around obstacles in the same manner as a tire.

The rigid plate 22a is concentrically mounted against the front lateral sidewall 18a of the tire covering its central orifice 20. Because the tire rim has been removed, the rigid plate 22a provides a support to the tire and an attachment point for the yokes 28a–d which will pull the tire swab 10 through the host pipe. The rigid plate 22a is normally made of steel, but it can be made of any material which provides sufficient strength to support the apparatus. The size of the rigid plate 22a is selected to allow the deflection necessary to avoid lodging the tire swab 10 on any obstructions.

The yoke attachment points 26a–d serve to provide an attachment point between the yokes 28a–d and the tire swab 10. They are attached to the end of connecting rods 24a–d which connect the rigid plate 22a to the tire 12. While four are shown, the yoke attachment points may vary in number according to the number of yokes. Also, the location of the yoke attachment points may vary depending on the desired distribution of the pulling force on the tire swab 10. While the yoke attachment points 26a–d are shown as loops, they may be of any other suitable attachment means.

The yokes 28a–d serve to distribute the pulling force of the cable 45 to the tire swab 10. They are made of any material capable of withstanding the applied pulling force, including materials of different degrees of flexibility. The number of yokes 28a–d may vary depending on how widely the pulling force is to be distributed on the tire swab 10.

The yokes 28a–d are connected to the cable 45 by a cable connection point 30a. The cable connection point 30a pulls all of the yokes 28a–d together to a single point to transfer the pulling force applied by the cable 45. The cable connection point 30a is shown as a loop, but any other suitable attachment mechanism could be used.

Figure 2:
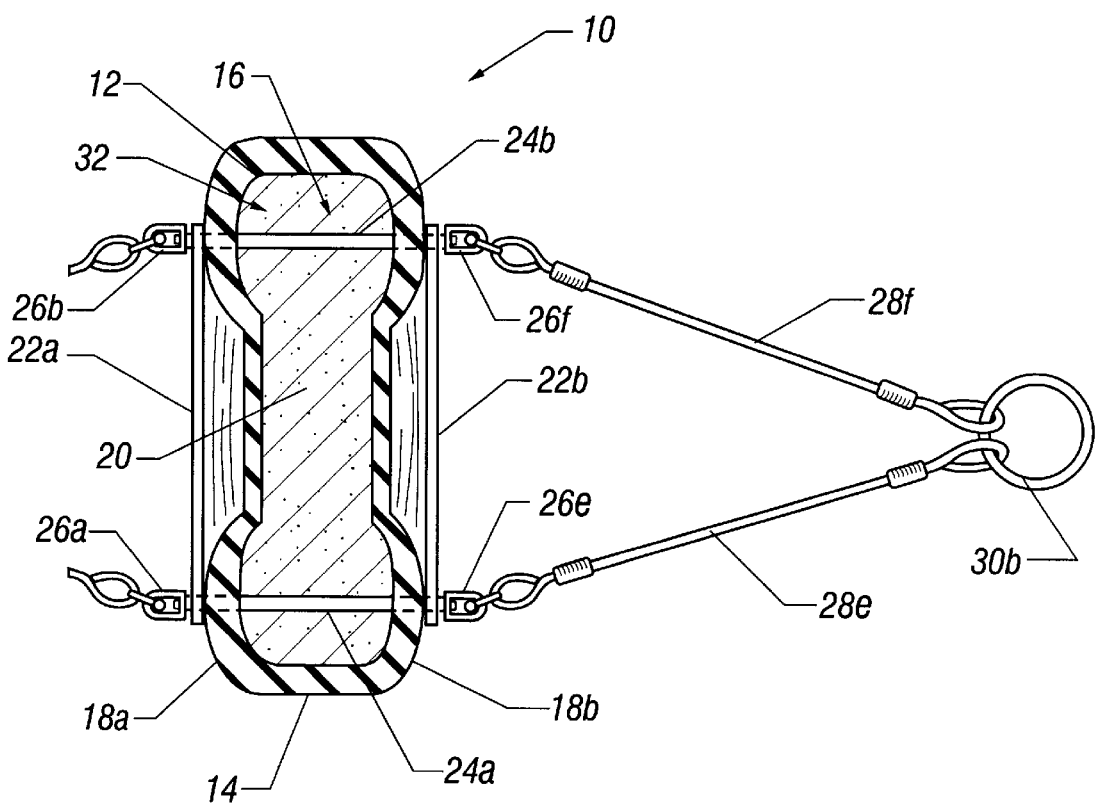
FIG. 2 is a cut-away side view of a swab.

FIG. 2 shows a cut-away side view of a tire swab. A second rigid plate 22b is shown mounted on the rear lateral sidewall 18b of the tire 12. The interior of the tire swab 10 shows the connecting rods 24a–b (24c–d are not shown) and the interior cavity 16 of the tire 12 which is filled with a low density foam 32. Also shown is an arrangement of yoke attachment points 26e–f (26g–h are not shown), yokes 28e–f (26g–h are not shown), and a cable attachment point 30b. This arrangement is identical to the arrangement mounted on the rigid plate 22a in FIG. 1 described previously. The connecting rods 24a–b (24c–d are not shown) extend through the tire 12 and both rigid plates 22a and 22b. Each connecting rod 24a–b has a yoke attachment point 26a–b and 26e–f on each end.

The interior cavity 16 of the tire is shown filled with a low density foam 32 to provide support to the tire 12. However, the tire 12 will be able to compress to a certain degree while it is pulled through the host pipe. While a low density foam 32 is shown, any material may be used to fill the tire 12 depending on its characteristics and the desired effect. For example, if additional weight is desired to stabilize the tire swab 10, sand may be used to fill the tire 12. Also, air could be used to provide better contact between the exterior surface 14 of the tire 12 and the wall of the host pipe. This provides a more efficient swabbing.

The rigid plate 22b and the arrangement of yoke attachment points 26e–f, yokes 28e–f, and cable attachment point 30b shown in FIG. 2, are an alternative embodiment of the tire swab in FIG. 1. The tire swab as shown in FIG. 1, has a tendency to turn within the host pipe when it is being pulled due to the pressure of the flow in the host pipe. Attaching the tire swab 10 to another cable (not shown in FIG. 2) on the other side of the tire swab 10 provides additional stability and reduces the tendency to turn. Additionally, if the tire swab 10 becomes wedged in the host pipe, the direction of the swab can be reversed by the other cable. This will avoid a costly stoppage of work and possible excavation to retrieve the swab.

Figure 3:
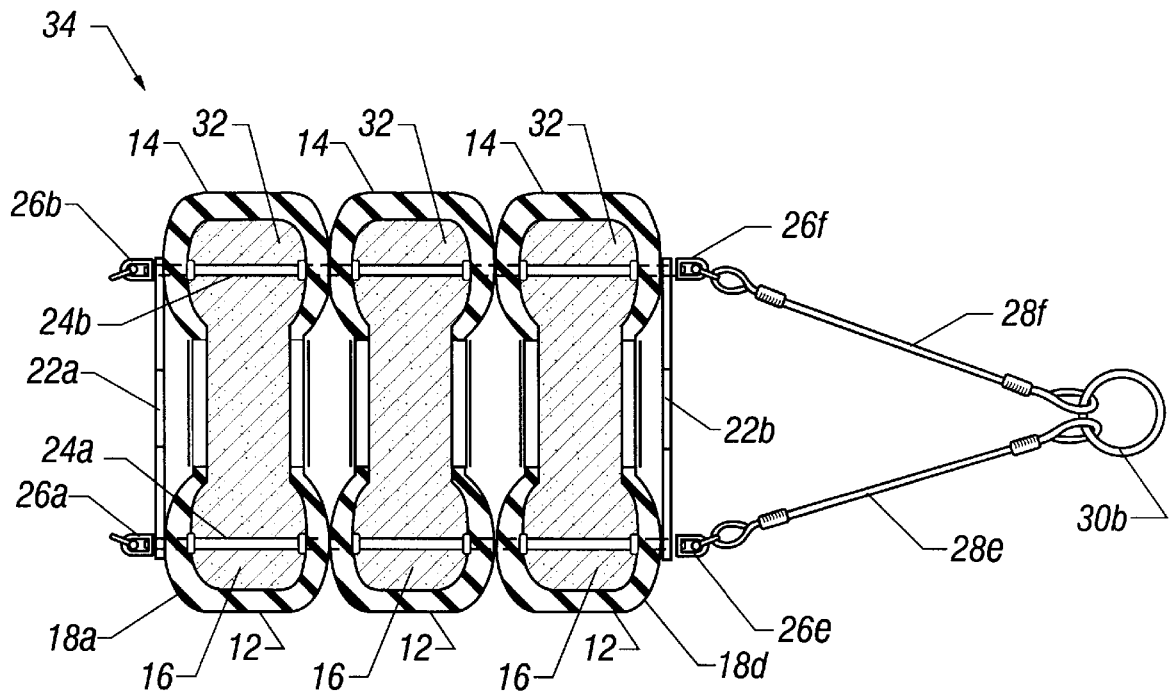
FIG. 3 is a cut-away side view of a multi-member swab.

An alternative embodiment consisting of a multi-tire swab 34 is shown in FIG. 3. The structure of the apparatus is essentially the same as shown in a single tire swab except that three tires 14 are used instead of just one. The tires 14 are identical to each other and are placed side by side with the connecting rods 26a–b (26c–d not shown) extending through each of them. While three tires are shown, any number could be used depending on the desired result.

As discussed previously, a single tire swab 10 has a tendency to turn while being pulled within the host pipe. A multi-tire swab 34 will not turn in the host pipe because of the length of the apparatus. In some circumstances, it is necessary to use a multi-tire swab 34 so as not to impose too great a load on the wall of the host pipe when a turn or deflection is encountered.

Figure 4:
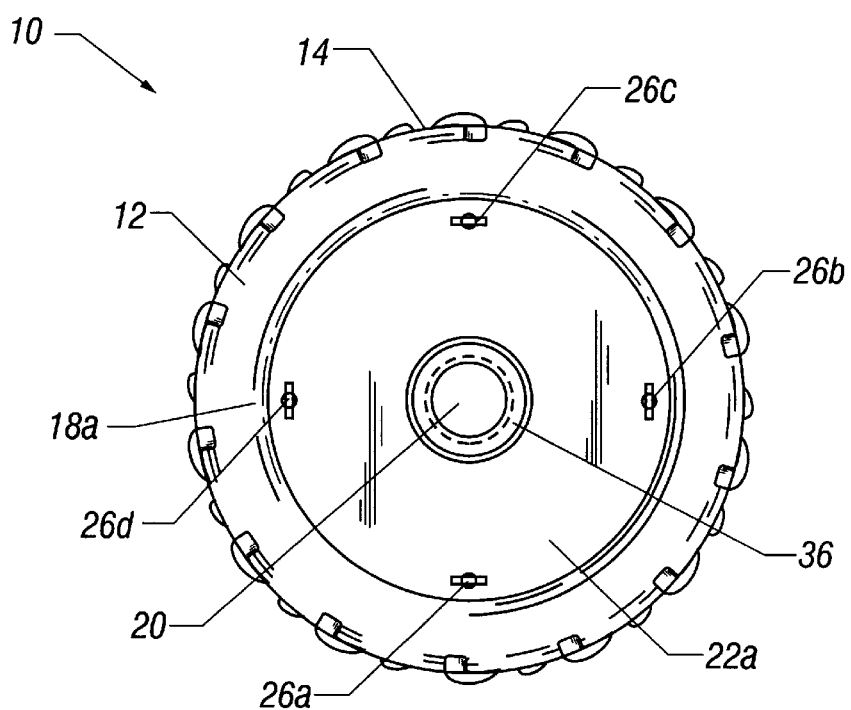
FIG. 4 is a frontal view of a swab with a flow pipe.
Figure 5:
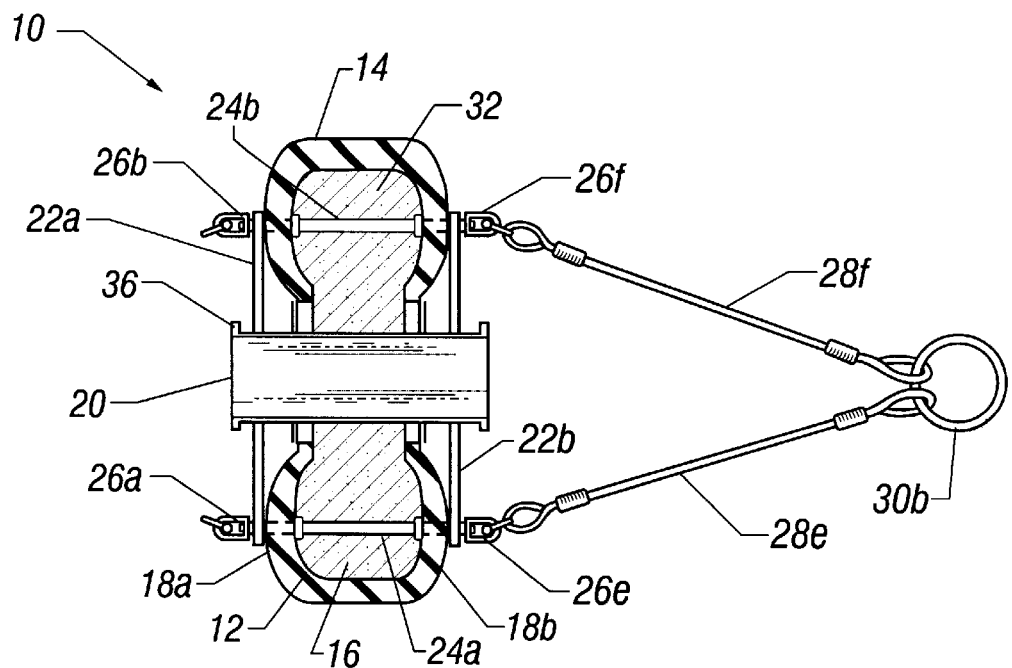
FIG. 5 is a cut-away side view of a swab with a flow pipe.
Figure 6:
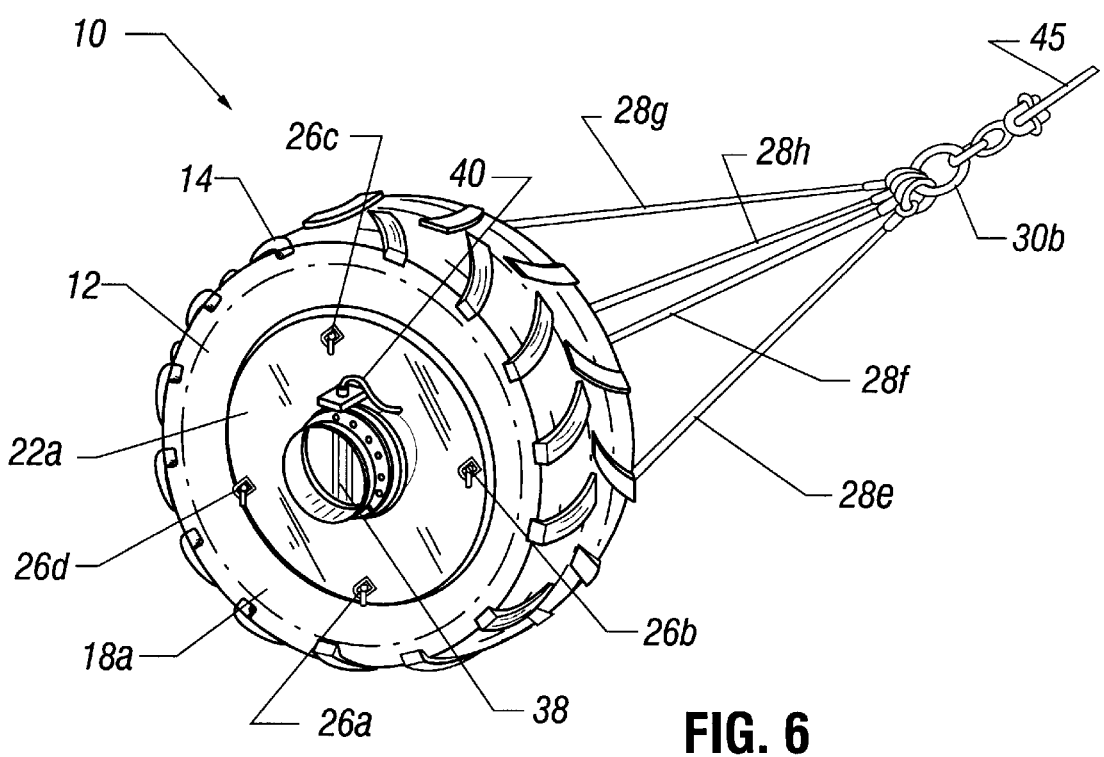
FIG. 6 is a perspective view of a swab with a flow pipe, valve and valve actuator.

FIG. 4 shows another embodiment where a tire swab 10 that has a flow pipe 36 with an orifice 20 located in the center of the tire. A cut away side view is shown in FIG. 5. FIG. 6 shows a valve 38 located within the flow pipe 36 and a valve actuator 40 that is used to control the opening and closing of the valve. The other structures of the tire swab 10 shown in FIGS. 4, 5 and 6 are the same as shown in FIG. 1.

The flow pipe allows the flow in the host pipe to pass through the orifice while the tire swab 10 is being pulled. This reduces the pressure on the swab and the tendency to turn within the pipe. Because the flow through the orifice 20 is moving at a greater velocity than through the host pipe, it can be used to create a jetting action to carry away the debris collected by tire swab 10.

Figure 7:
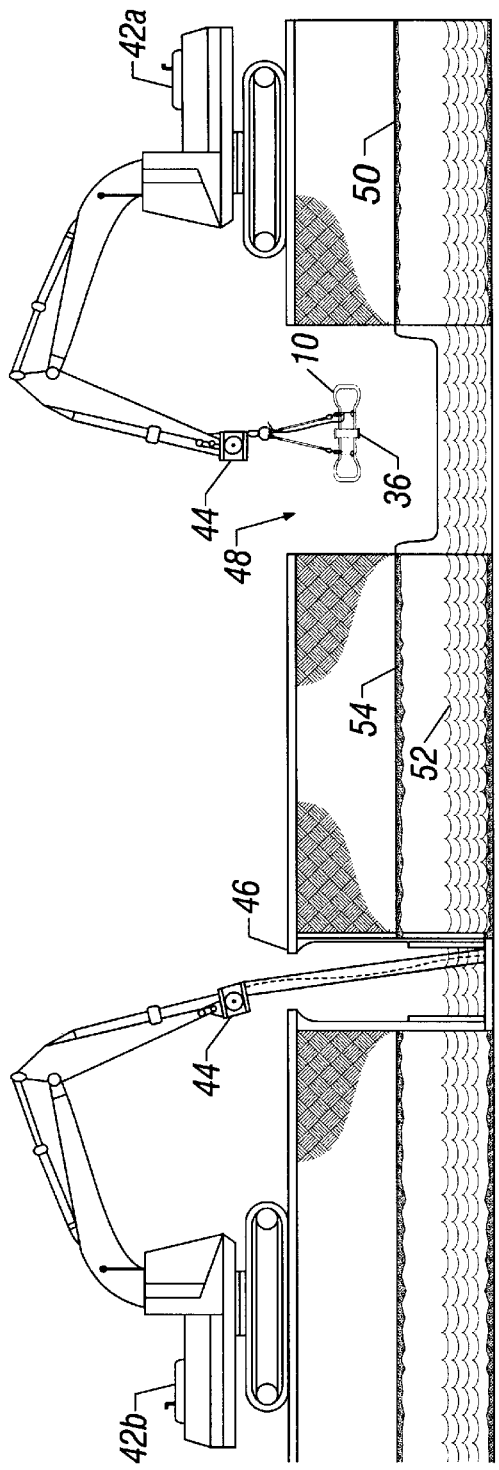
FIG. 7 is a perspective view of an operation using a swab with a flow pipe.
Figure 8:
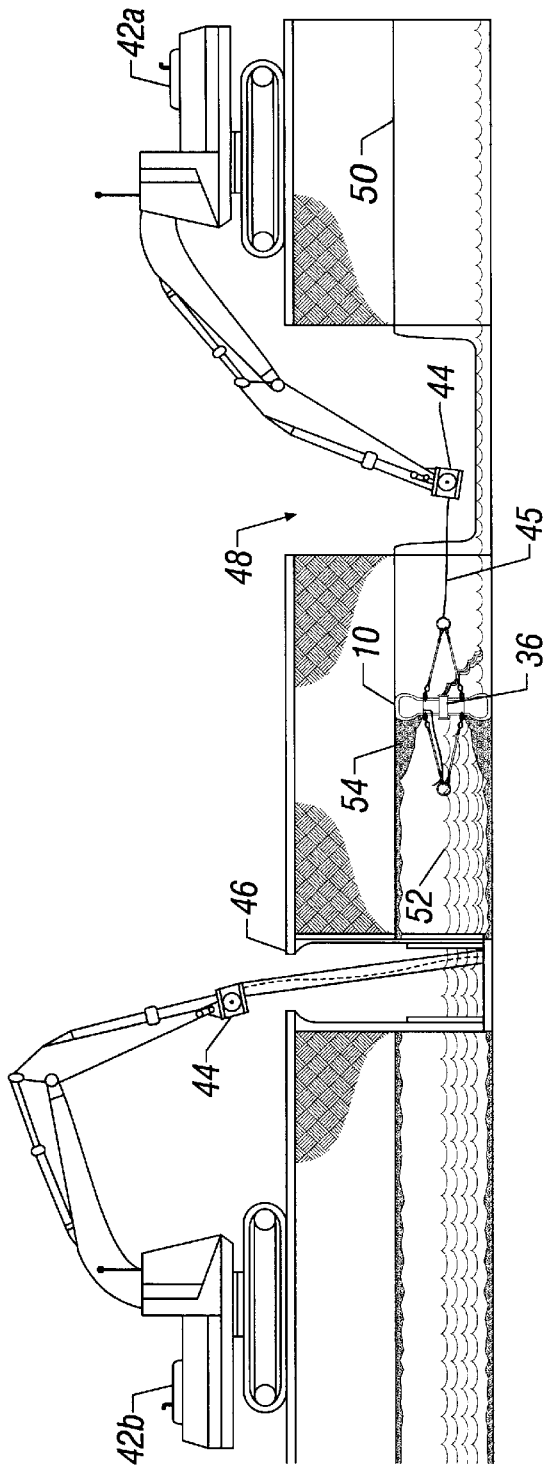
FIG. 8 is a perspective view of an operation using a swab with a flow pipe.
Figure 9:
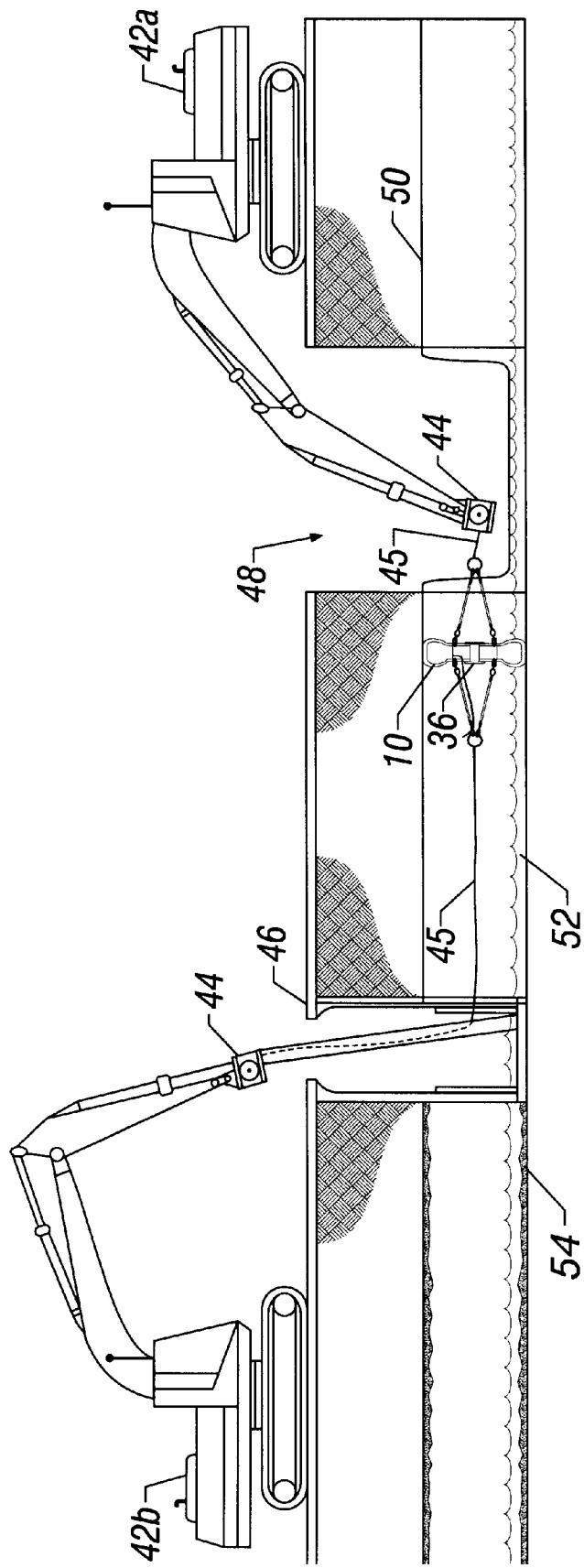
FIG. 9 is a perspective view of an operation using a swab with a flow pipe.

FIGS. 7, 8 and 9 show the tire swab 10 with a flow pipe 36 being used to clean a host pipe 50. In FIG. 7, the tire swab 10 is lowered into the excavated access area 48 by a winch 44 mounted on a vehicle 42a. Another vehicle 42b with a winch 44 is located at the far end of the segment to be cleaned. In this case, access to the host pipe 50 is provided via an existing manhole 46.

Once the tire swab 10 is positioned within the host pipe 50, it is connected to each vehicle 42a and 42b and pulled through the pipe. As shown in FIG. 8, the debris 54 within the host pipe 50 is collected in front of the tire swab 10 and pushed toward the manhole 46. At the manhole 46, it is removed by a vacuum mechanism or other suitable means. The flow pipe 36 allows the host pipe to remain in service while being cleaned. The flow 52 in the host pipe 50 is able to pass through the flow pipe 36 in the tire swab 10 while the cleaning is in process.

Figure 10:
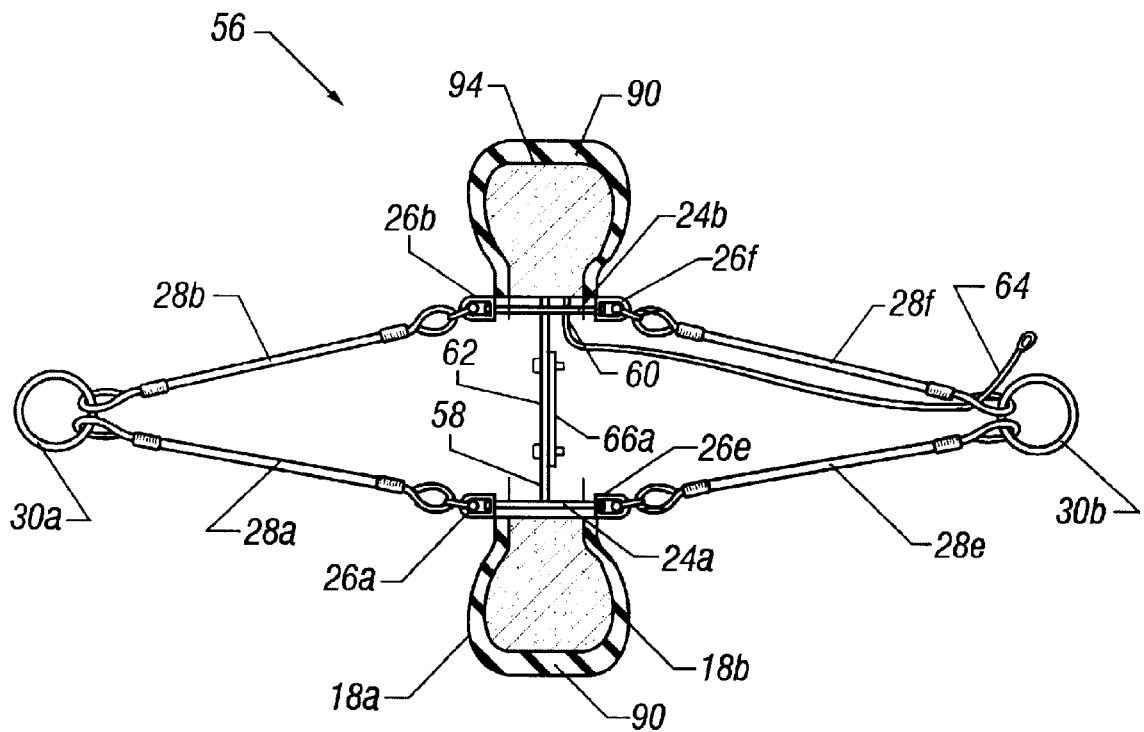
FIG. 10 is a cut-away side view of a plug.

Another use of the claimed invention is as a plug to block the flow in a host pipe. FIG. 10 shows a cut-away side view of an embodiment of a single tire plug 56. The structure of the apparatus is essentially the same as the tire swab, except that a circular tire rim 58 is mounted within the tire 90 instead of rigid plates mounted against the sidewalls. The tire rim 58 is a conventional type rim for mounting the tire on a vehicle. It has an axle connector 62 for attachment to such a vehicle. An alternative embodiment uses a pre-fabricated rigid support in place of the tire rim. It should be made of a material of sufficient strength to fully support the tire 90.

A valve stem 60 extends from the interior cavity 94 of the tire 90 through the tire rim 58. The interior cavity 94 is empty so that once the plug is positioned, it can be inflated with air until the exterior surface 92 of the tire 90 is in solid contact with the wall of the host pipe. The valve stem 60 is connected to an air tube 64 which uses a source of compressed air to inflate the tire 90. The valve stem 60 is also used to deflate the tire 90 when the plug is to be removed from the host pipe.

An alternative embodiment uses a bladder which is located in the interior cavity 94 of the tire 90. The bladder holds the compressed air which is used to inflate the tire 90. In this embodiment, the valve stem 60 would extend into the bladder instead just the interior cavity 94.

Figure 11:
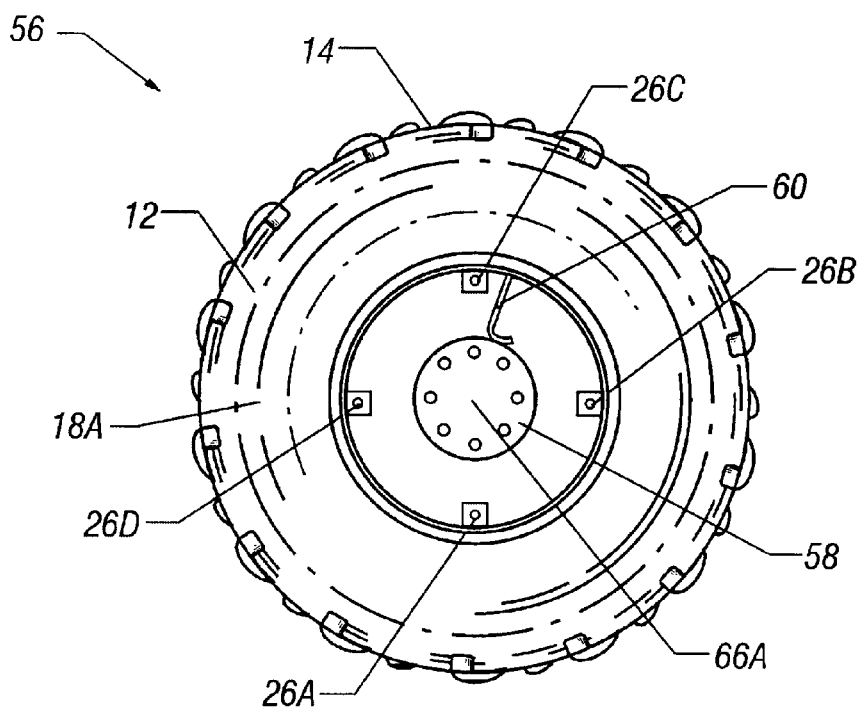
FIG. 11 is a frontal view of a plug.

FIG. 11 shows a frontal view of the tire plug 56 with a rigid cover 66a attached over the axle connector 62 of the tire rim 58. This completes the seal of the apparatus and thus block the flow. The rigid cover 66a is normally made of steel, but it could be made of a material of sufficient strength to withstand the applied forces and maintain a seal. If a pre-fabricated support is used instead of a tire rim, the axle connector will not be present and so the rigid cover 66a will not be necessary.

Figure 12:
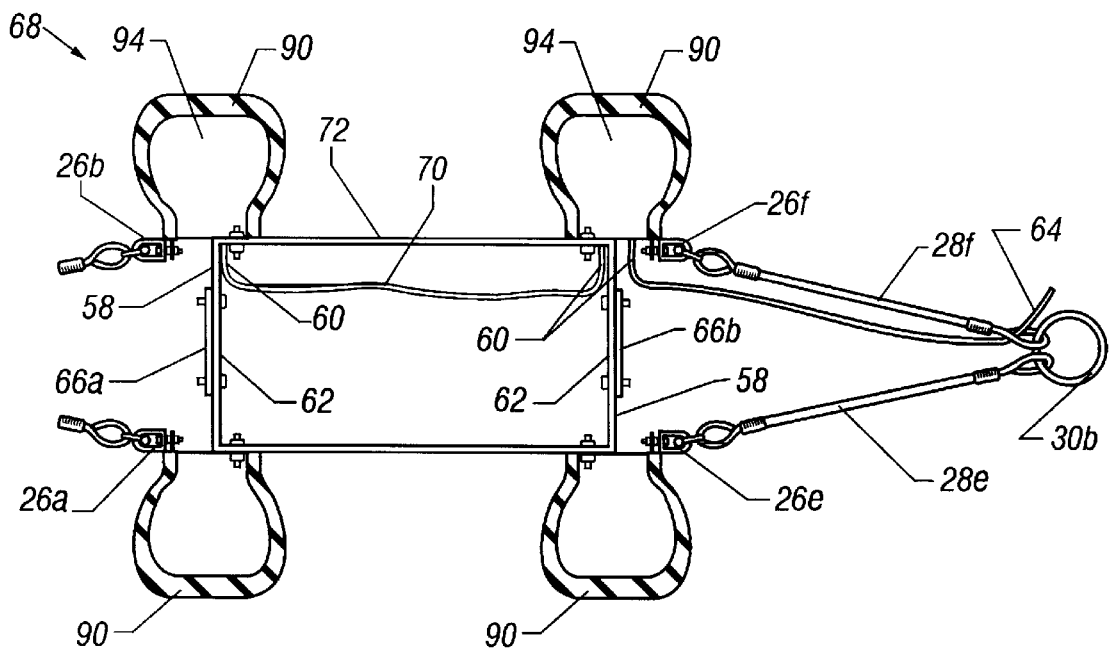
FIG. 12 is a cut-away side view of a multi-member plug.

An alternative embodiment of a tire plug is shown in FIG. 12. A cut-away side view of a dual-tire plug 68 shows two single tire plugs as previously described, which are connected by a pipe 72 and a transfer air tube 70. While a pipe 72 is shown, any other suitable device to transfer the flow through the plug could be used. The dual-tire plug 68 uses a second tire as a back-up should the first tire leak. The transfer air tube 70 serves to transfer air pressure between the tires so that one source may be used to inflate both. While two tires are shown in FIG. 12, any number could be used as the circumstances require.

Figure 13:
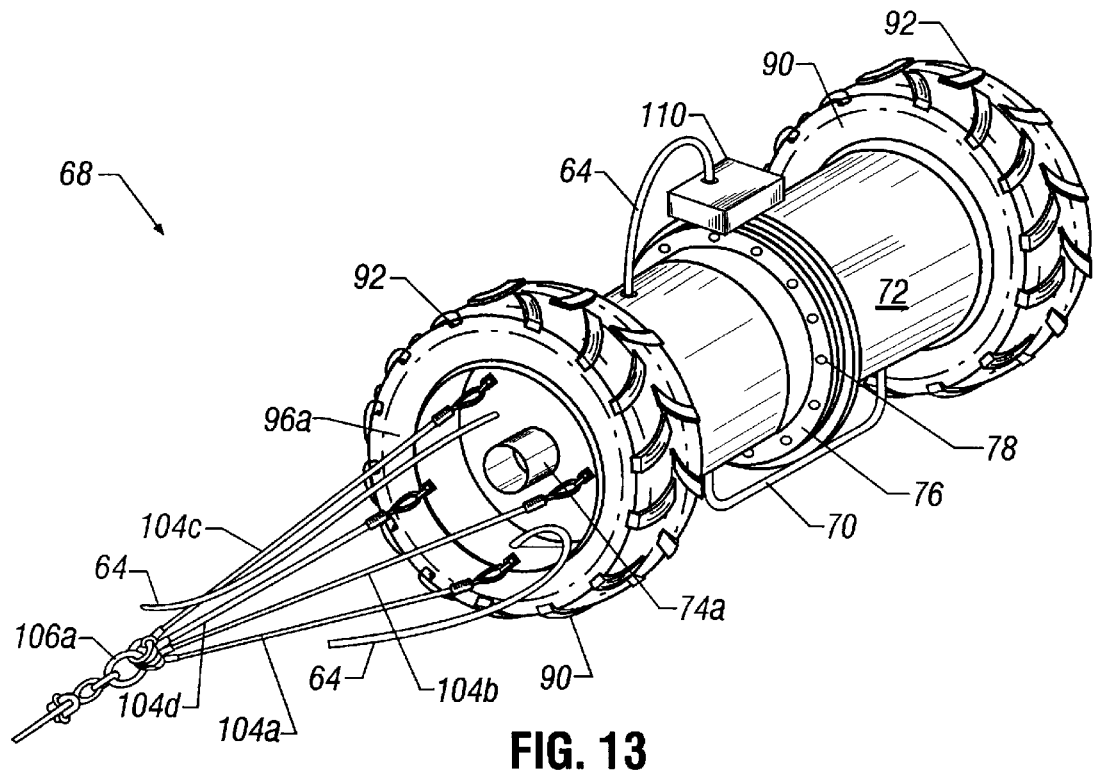
FIG. 13 is a perspective view of a multi-member plug with a valve actuator.
Figure 14:
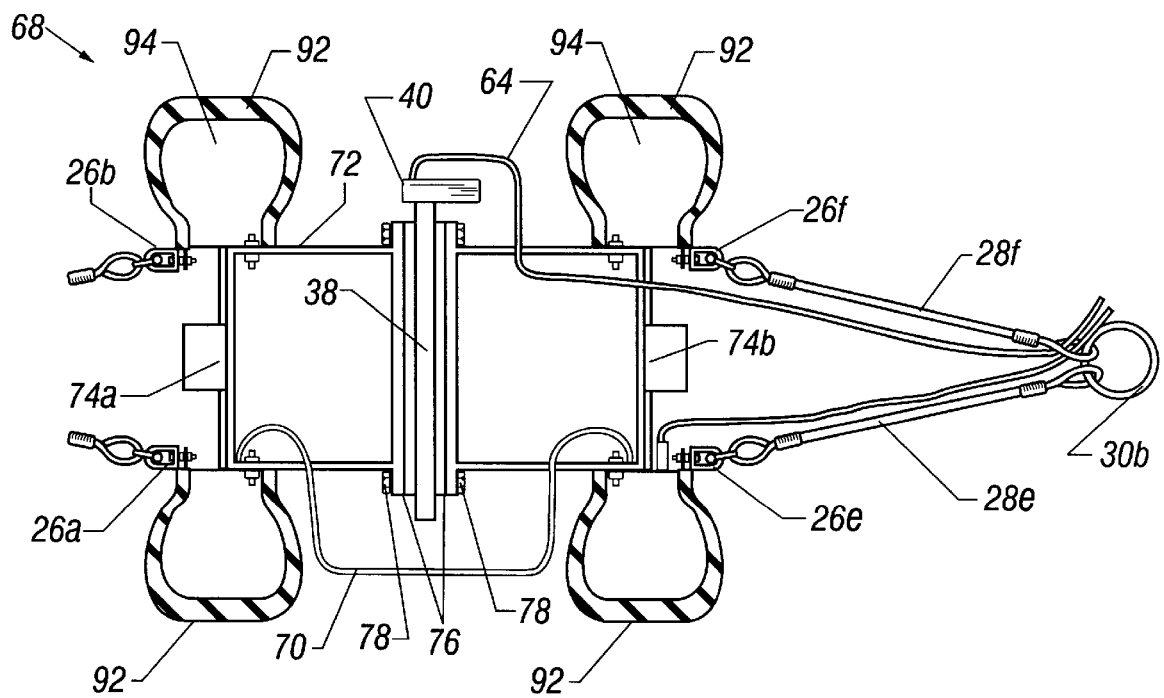
FIG. 14 is a cut Away side view of a multi-member plug with a valve and valve actuator.

Another embodiment of the dual-tire plug is shown in FIGS. 13 and 14. Two flow orifices 74a and 74b are located in each rigid support which allow the flow into the pipe 72 which connects the tires 92. The pipe 72 is separated into segments which are connected by a pair of flanges 76. The flanges 76 are attached to each other by flange connectors 78 which may be a nut and bolt, a rivet or other suitable connectors. A valve 108 and valve actuator 110 is located at the junction of the flanges 76. The valve 108, which is controlled by the valve actuator 110, opens and closes to pass or block the flow in the pipe 72. The valve 108 may be a "butterfly valve" or any other suitable type of valve which is sufficient to block the flow within the pipe 72.

FIG. 15 shows a single tire plug 56 in use in a host pipe 122. The single tire plug 56 is placed upstream of an excavated access area 120. An air compressor 80 on the surface is used to inflate the tire plug 56 with an air tube 64. Once the flow 124 is blocked, the work may proceed in the excavated access area 120. FIG. 16 shows an identical installation using a dual tire plug 68. It this embodiment, the additional tire provides additional protection if the first tire should leak.

Figure 17:
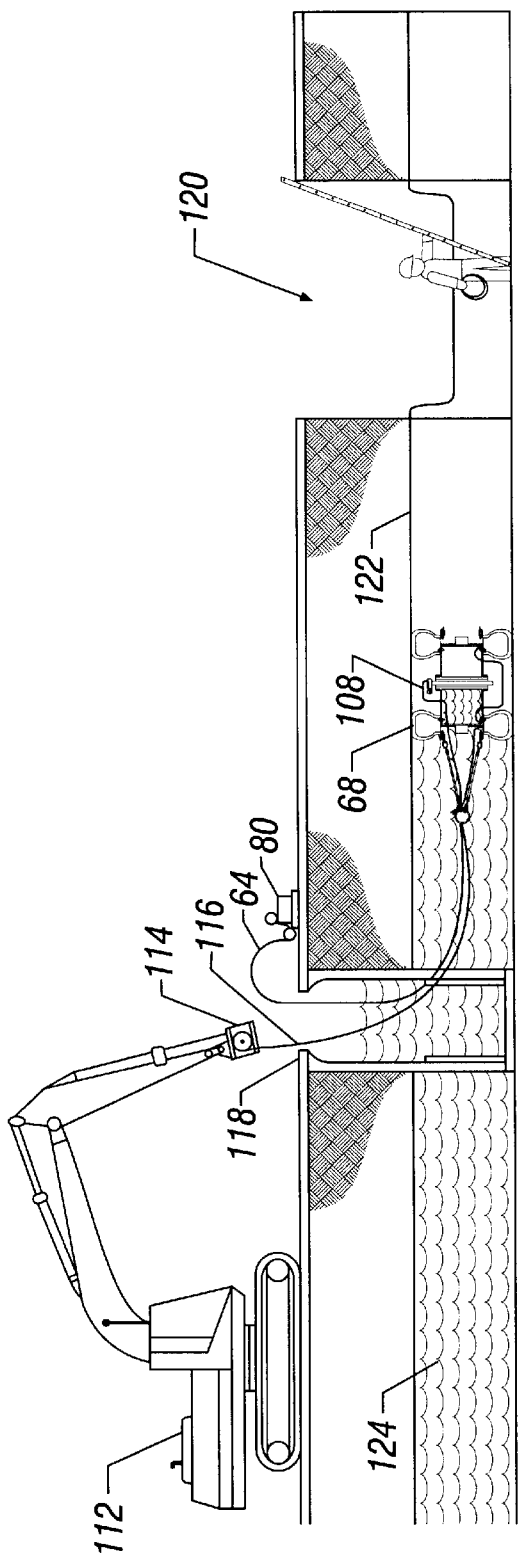
FIG. 17 is a perspective view of an operation using a multi-member plug with a valve.
Figure 18:
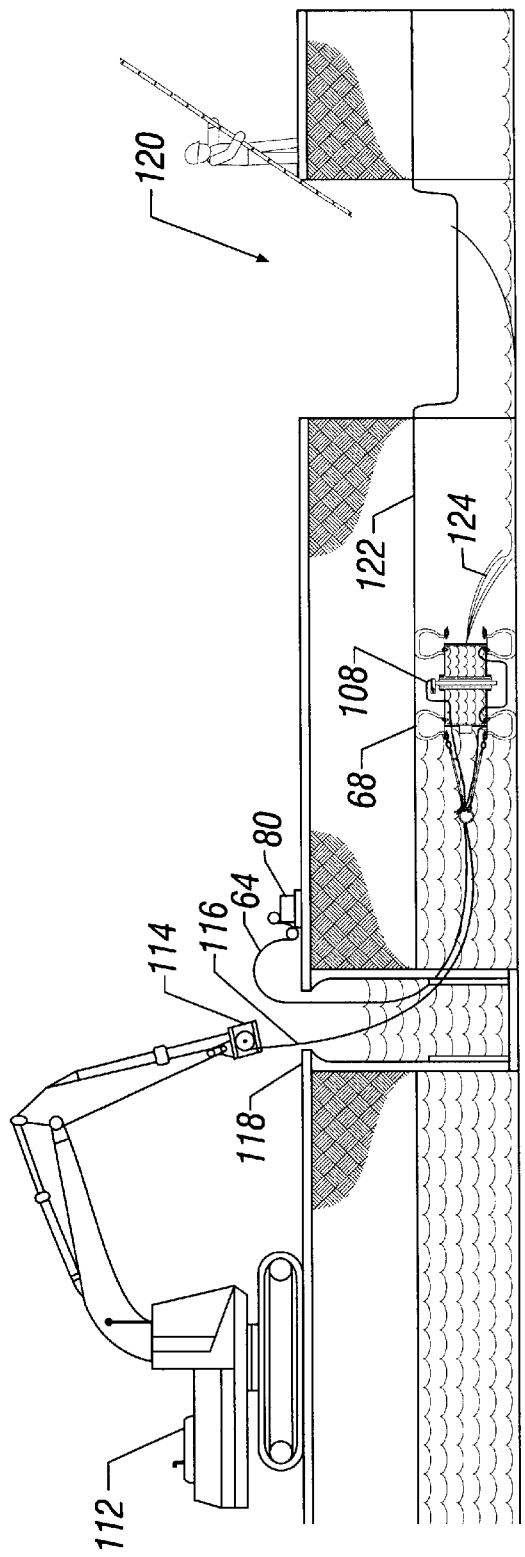
FIG. 18 is a perspective view of an operation using a multi-member plug with a valve.

FIGS. 17 and 18 show an installation with the dual tire plug 68 with the valve 108 to control the flow 52. In FIG. 17, the valve 68 is closed and the flow 124 is blocked so that work may be done in the excavated access area 120. Once the work is completed, the valve 68 can be opened and the flow 124 resumed in the host pipe 122. The flow 124 may be resumed while keeping the dual tire swab 68 in place. This has the advantage of shutting off the flow 124 at a later time without the expense of re-installing another plug.

Figure 19:
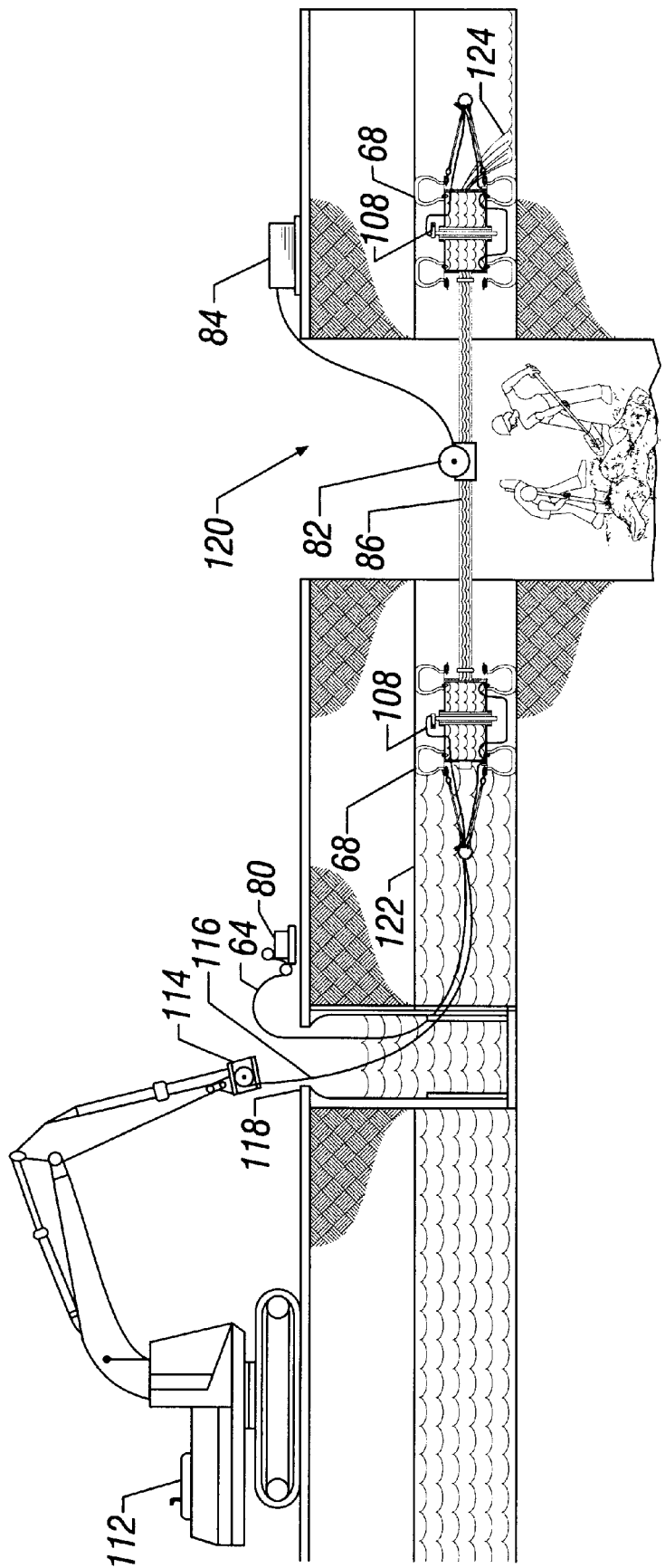
FIG. 19 is a perspective view of an operation using a multi-member plugs and a transfer pipe.

FIG. 19 shows another use of the dual tire plug 68. In this configuration, two dual tire plugs 68 are installed in the host pipe 122 on either side of the excavated access area 120. A transfer pipe 86 connects the tire plugs 68. This allows the work in the excavated access area to proceed while the host pipe 122 remains in service. The transfer pipe 86 can remain in place indefinitely while the work is continuing.

What is claimed is:

1. A method for cleaning a host pipe with a swab comprising steps of:
    positioning the swab comprising at least one flexible circular member with a rigid plate mounted on the flexible circular member with at least one cable attachment point on at least one of each side of the rigid plate inside a host pipe;
    connecting a cable to a cable attachment point;
    pulling the swab by the cable through the host pipe; and
    cleaning the host pipe interior with the swab.

2. The method of claim 1 wherein the swab comprises a single tire.

3. The method in claim 1 wherein the swab is a multi-tire swab.

4. The method of claim 1 further comprising the steps of:
    connecting a second cable to an attachment point on a side of the swab opposite an initial cable attachment; and
    cleaning the host pipe by pulling the swab through the interior of the host pipe by both cables, alternatively.

* * * * *

UNITED STATES PATENT AND TRADEMARK OFFICE
CERTIFICATE OF CORRECTION

PATENT NO. : 6,099,657

DATED : August 8, 2000

INVENTOR(S) : Mark L. Boyer

It is certified that error appears in the above-indentified patent and that said Letters Patent is hereby corrected as shown below:

Col. 1, line 64, after "In an alternative embodiment, the exterior surface" delete "f" and insert --of--.

Col. 1, line 65, after "A further embodiment includes" insert --a--.

Col. 1, line 66, after "disposed in the interior orifice of the tire to" delete "old" and insert --hold--.

Col. 2, line 35, after "FIG. 14 is a cut" delete "Away" and insert --away--.

Col. 2, line 45, after "FIG. 19 is a perspective view of an operation using" delete "a".

Col. 4, line 37, before "has a flow pipe 36 with an orifice 20" delete "that".

Col. 5, line 26, before "just the interior cavity 94" insert --of--.

Col. 5, line 30, before delete "block" and insert --blocks--.

Signed and Sealed this

Seventeenth Day of April, 2001

*Attest:*

NICHOLAS P. GODICI

*Attesting Officer*  Acting Director of the United States Patent and Trademark Office